United States Patent [19]
Reynolds

[11] Patent Number: 6,129,440
[45] Date of Patent: Oct. 10, 2000

[54] SWITCH-OPERATED MEMBER WITH STATUS LIGHT PIPE INCORPORATED THEREIN

[75] Inventor: Douglas S. Reynolds, Clinton, Utah

[73] Assignee: Iomega Corporation, Roy, Utah

[21] Appl. No.: 09/191,903

[22] Filed: Nov. 13, 1998

[51] Int. Cl.[7] .................................................. F21V 33/00
[52] U.S. Cl. ......................... 362/95; 362/581; 362/551; 362/559
[58] Field of Search ................................. 362/31, 23, 28, 362/551, 559, 581, 95; 200/308, 310, 313, 314; 250/465.1

[56] References Cited

U.S. PATENT DOCUMENTS

| | | | |
|---|---|---|---|
| 4,549,050 | 10/1985 | Lang | 200/314 |
| 5,345,367 | 9/1994 | Pierce et al. | 362/32 |
| 5,743,382 | 4/1998 | Luo | 200/315 |
| 5,988,842 | 11/1999 | Johnsen et al. | 362/551 |

*Primary Examiner*—Sandra O'Shea
*Assistant Examiner*—Ismael Negron
*Attorney, Agent, or Firm*—Woodcock Washburn Kurtz Mackiewicz & Norris LLP

[57] ABSTRACT

A switch for use in an electronic device that includes a support portion and a light pipe. The support portion is formed to receive the light pipe such that an integrated switch/status indicator may be fashioned. The support portion further is formed such that it may be mounted to the electronic device. The integrated switch provides for a device that is capable of transmitting status information to a user, without requiring additional electrical connections to the switch.

28 Claims, 5 Drawing Sheets

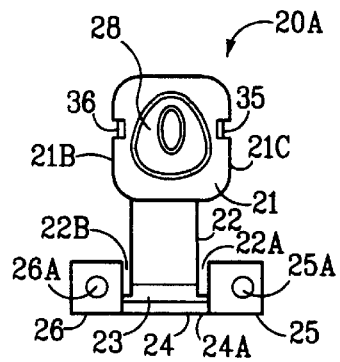
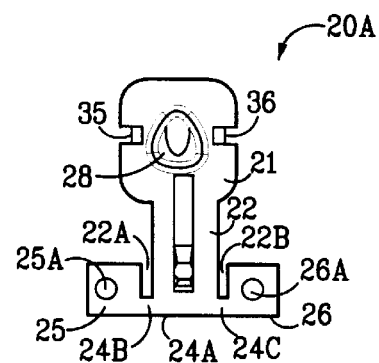
FIG. 1A  FIG. 1B
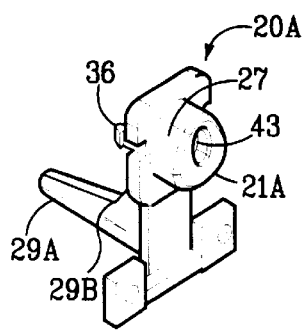
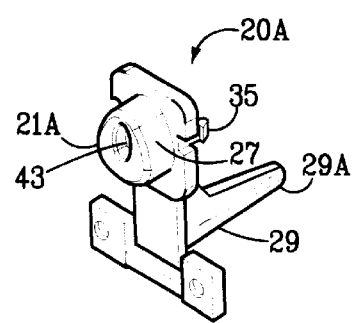
FIG. 1C  FIG. 1D
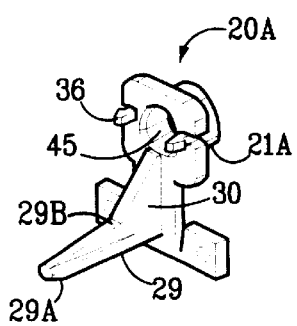
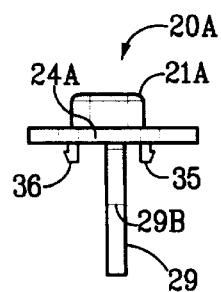
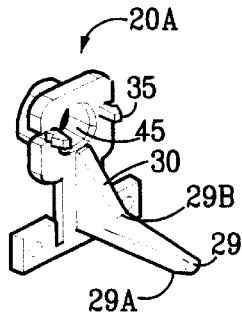
FIG. 1E  FIG. 1F  FIG. 1G

SWITCH-OPERATED MEMBER WITH STATUS LIGHT PIPE INCORPORATED THEREIN

FIELD OF THE INVENTION

The present invention relates to system status indicators. In particular, the present invention relates to a system status indicator, having a light pipe, that is incorporated into a switch operating member.

BACKGROUND OF THE INVENTION

Status indicators have been used on electrical devices for many years and are well known in the art. Status indicators provide feedback and other useful information to the users of electrical devices. Typically, the status indicator is an analog meter, light emitting diode (LED), or an audible alarm, etc. that indicates certain operating conditions of the electrical device. For example, many computer peripherals include an LED to indicate that the peripheral is powered ON, transferring data, or encountering an error.

By necessity, visual status indicators, such as meters and LEDs are located on the device such that they are clearly visible to the user, otherwise they would fail to serve their intended purpose. Typically, the meter or LED is provided on a face or other exposed portion of the electronic device. This has the disadvantage of requiring additional electrical connections, sockets, etc. at the point where the indicator is to be mounted to the device, which may increase the complexity of the wiring and/or costs.

A solution to this problem is to use a light pipe. Light pipes are well known in the art and are used when it is desirable to mount a light source (e.g., LED) on a printed circuit board, but it is necessary to see the light from the LED at a location that is remote from the LED. The light pipe transmits the light from the remote LED to the viewing location. Light pipes are also well known in the art and are formed from an extruded material such as plastic to provide a path for light. One such solution is disclosed in U.S. Pat. No. 5,345,367, to Pierce et al., which illustrates a light pipe for use in a PC Card that guides light from an internal LED to the periphery of the PC Card.

While using a light pipe reduces the complexity of the electrical device by reducing the additional electrical connections necessary to provide the status indicator, it still has the disadvantage of requiring additional space on the exposed portion of the device. While this is generally not a problem with larger devices, it becomes an important consideration with smaller electronic devices, such as external disk drives, portable radios, etc., where it is desirable to reduce the size of the devices.

U.S. Pat. No. 5,743,382, to Luo, illustrates a different prior art solution to the aforementioned problem. Luo discloses a switch having a displaying function, that includes a neon light to indicate the status (e.g., ON/OFF) of the switch. To provide this function, the switch includes a two-piece housing, resilient elements, a spring, and a plurality of contacts. While this is an improvement over providing a separate switch and indicator, the structure disclosed by Luo is fairly complicated and is not well suited for use in small electronic devices. Further Luo fails to address the problem of the additional complexity required to provide the status indicator external of the device.

While devices such as the Pierce et al. and Luo serve the purpose of providing a status indicator on an electrical device, they fail to provide a status indicator having a reduced complexity that also reduces the space required by incorporating the status indicator into a switch or other movable element external to the device. In particular, the light pipe of Pierce et al. is rigidly mounted within the PC Card, and is not operably movable. The status indicator of Luo is very complex and requires electrical contacts, which may fail over time.

In view of the above, there is a need for simple status indicator that is incorporated into a movable element external to the electrical device. Preferably, the status indicator is incorporated into a movable element that is required for normal operation of the device, such as an ON/OFF switch, eject button, or other. The present invention seeks to solve the aforementioned need by providing a simple status indicator within a required button of an electronic disk drive in order to conserve space and increase reliability of the indicator.

SUMMARY OF THE INVENTION

In view of the above, the present invention, through one or more of its various aspects and/or embodiments is thus presented to accomplish one or more objects and advantages, such as those noted below.

In accordance with an aspect of the present invention, there is provided a switch incorporating a status indicator that comprises a support having a base, a support body, and a head having a protrusion. The switch also includes a light pipe having an indicator face, a light conducting body, and a light conducting base.

According to a feature of the invention, the protrusion defines a first opening such that a portion of the light pipe may pass there through. The protrusion may be adapted to pass through a second opening in an electrical device. In addition, the indicator face may be adapted to be received by the first opening.

According to another feature of the invention, the head further comprises hooks that extend from the head in a direction opposite the protrusion. The hooks engage a portion of the light pipe to secure the light pipe to the support. The light conducting body may further have brackets that are received by the hooks to mount the light pipe to the support. Each bracket may comprise two generally "L"-shaped sections, wherein one leg of each "L" is attached to the light pipe, and other legs of each "L" are connected together at a predetermined angle.

According to yet another feature of the invention, the base further comprises rectangular ends that are adapted to be mounted to an electrical device.

According to a further feature, the support comprises a lever section and a lever support section. The lever section is adapted to engage a contact switch in an electrical device. In addition, the light conducting base may include a generally "U"-shaped member that is adapted to be received by the lever section.

According to a feature of the invention, the light conducting body is formed having a predetermined shape such that the light conducting body is adapted to be received by the support. The light conducting body may include an upper portion formed as a tapered section which terminates at a tip having generally parallel sides. The upper portion may also include wedge shaped protrusions formed on opposing sides of the tapered section, the wedge shaped protrusions being provided to contact a rear of the protrusion when the light pipe is mounted to the support.

According to yet another feature, the base comprises generally rectangular ends that each define an aperture through which a corresponding shaft of an electrical device to which the switch is to be mounted passes. The switch is mounted to the shafts such that the switch hinges about a recess to engage a contact switch provided in the electrical device.

According to still another feature, the switch receives light from a light source in the electrical device and transmits the light via the light pipe such that the light is visible at the indicator face. The indicator face may extend through a first opening defined by the protrusion when the light pipe is mounted to the support. The protrusion may also extend through a second opening in the electrical device, such that the protrusion and the indicator face extend from the electrical device.

According to another aspect of the present invention, there is provided an electronic device having a switch that includes a status indicator incorporated therein, the switch having a support, and the status indicator having a light pipe. The switch is mounted to the electronic device and the light pipe transmits light from a light source located within the electronic device to an indicator face of the light pipe that is positioned within a first opening of a protrusion that extends from the support, such that the protrusion and the indicator face are external of the electronic device.

According to a feature of the invention, the support comprises a base, a support body, and a head having a protrusion, and wherein the light pipe comprises an indicator face, a light conducting body, and a light conducting base.

According to another feature, the base further comprises rectangular ends, the rectangular ends being adapted to be mounted to an electrical device.

According to yet another feature, the support further comprises a lever section and a lever support section. The lever section is adapted to engage a contact switch in the electrical device.

According to still another aspect of the invention, there is provided a switch incorporating a status indicator having a support that includes a base, a support body, a head having a protrusion, and a lever section, and a light pipe having an indicator face, a light conducting body, and a light conducting base. The protrusion defines a first opening such that the indicator face of the light pipe may pass there through, and the protrusion is adapted to pass through a second opening in an electrical device.

According to a feature of the invention, the head further comprises hooks that extend from the head in a direction opposite the protrusion, and wherein the hooks engage a portion of the light pipe to secure the light pipe to the support.

According to another feature, the light conducting body further includes brackets, the brackets being adapted to be received by the hooks to mount the light pipe to the support.

According to a further feature, the base further has rectangular ends, the rectangular ends being adapted to be mounted to the electrical device.

According to yet another feature, the lever section is adapted to engage a contact switch in the electrical device.

According to yet another feature, the switch receives light from a light source in the electrical device and transmits the light via the light pipe such the light is visible at the indicator face.

Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings:

FIGS. 1A–1G illustrate a support a portion of an integrated status indicator and switch operating member of the present invention;

DETAILED DESCRIPTION OF THE PREFERRED EMBODIMENTS

Figure 2A:
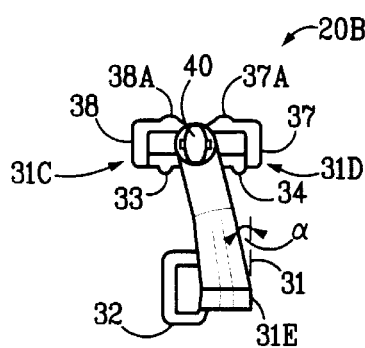
FIGS. 2A–2G illustrate a light pipe which is used in the integrated status indicator and switch operating member of the present invention.

The present invention advantageously provides for an integrated switch operating member and status indicator, which may be used in electrical devices. FIGS. 1–3 illustrate the integrated switch 20 and status indicator of the present invention in greater detail. As shown in the drawings, the switch operating member 20 includes a support portion 20A and a light pipe 20B. Each will now be described in greater detail.

Referring to FIGS. 1A–1G, the support portion 20A is formed as a single piece that comprises a generally rectangular head 21 having rounded edges. The support may be made from, e.g., a polycarbonate (PC) and acrylonitrile-butadiene-styrene terpolymer (ABS) plastic such as Cycoloy® C2800 available from GE Corp.

Opposing sides 21B and 21C define two slots, from which two projecting hooks 35 and 36 are formed that extend toward the back of the support 20A. The hooks 35 and 36 are provided to latch to a portion of the light pipe 20B to secure the light pipe 20B to the support 20A (see, FIG. 3). Extending in a forward direction of the head 21, opposite that of the hooks 35 and 35, is a ovoid or tear-drop shaped protrusion 21A having walls 27 and a face 28. The face 28 has a complementary shape to the ovoid-shaped opening 12 in the front panel 11 of the electrical device 10 such that it may pass therethrough. The face 28 further defines a generally oval-shaped opening 43, through which a portion of the light pipe 20B extends when mounted thereto (see, FIG. 3). As best illustrated in FIGS. 1C and 1D, the walls 27 and face 28 have a thickness that is approximately equal to the thickness of the head portion 21.

The head 21 is supported by a rectangular body 22 that extends upward from a base 24. As illustrated in FIGS. 1A and 1B, the head 21 is offset to one side with respect to the body 22. Such an offset is provided in the exemplary support 20A, to properly align the switch operating member 20 within the electrical device 10. It is within the scope of the present invention to provide the head 21 with or without an offset with respect to the body 22 in order to align the switch 20 to the electrical device 10. A recess 23 having a circular cross section is formed at the intersection of the body 22 and base 24. Formed on each side of the base 24 are generally rectangular ends 25 and 26, each defining a circular hole 25A and 26A, respectively. As illustrated in FIGS. 1A and 1B, the ends 25 and 26 are connected to the base 24 by portions 24B and 24C, respectively. The portions 24B and 24C extend from an edge 24A of the base to approximately a mid-point of the recess 23, which forms rectangular gaps 22A and 22B between the body 22 and the ends 25 and 26, respectively.

The holes 25A and 26A cooperatively engage with shafts 11A and 11B, respectively, formed on the rear of the front panel 11 of the electrical device 10 to mount the switch 20 to the electrical device 10. Although the holes 25A and 26A are illustrated in the Figures as having different orientations with respect to the end in which they are formed (i.e., hole 25A is offset), it is noted that holes 25A and 26A are not limited to such positions or a circular shape, and may be defined with any shape and position such that they may secure the switch 20 to the front panel 11. The switch 20 is mounted to the device 10 by securing the base 24 to the shafts 11A and 11B by heating, ultrasonic welding, or glue, etc. Such a mounting advantageously enables the switch 20 to hinge about the recess 23 when depressed by a user as the recess 23 of the support 20A is flexed within the plastic range of the material limits.

As best shown by FIGS. 1C–1G, extending rearward of the body 22 is a lever section 29, which meets a triangular portion 30 at vertex 29B. The lever section 29 is mounted to the body 22 by the triangular portion 30, which advantageously provides additional rigidity to the lever section 29. The lever section 29 tapers moving away from the body 22, and has an angled portion 29A. The line formed on the lever 29 where the angled portion 29A begins to slope is provided to contact a switch 50 (FIG. 5) provided on a printed circuit board 49 within the electrical device 10. When a user depresses the switch 20, the angled portion 29A contacts and closes the switch 50. A resilient force provided by the recess 23 acts upon the lever section 29 to return the switch 20 to its original position with respect to the front panel 11. This action also opens the switch 50.

Figure 2B:
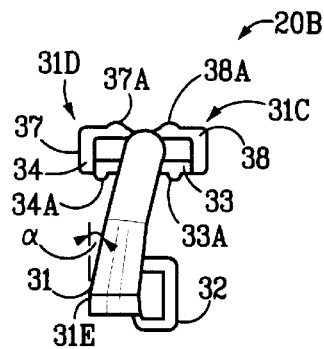
Figure 2C:
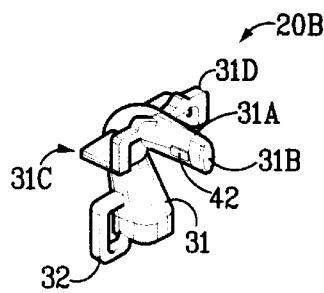
Figure 2D:
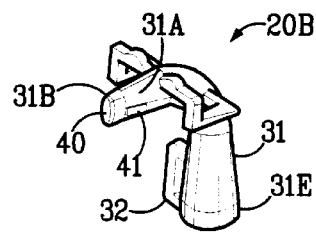
Figure 2E:
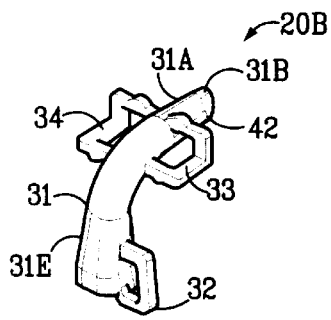
Figure 2F:
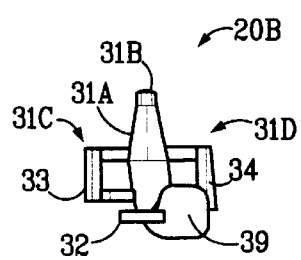
Figure 2G:
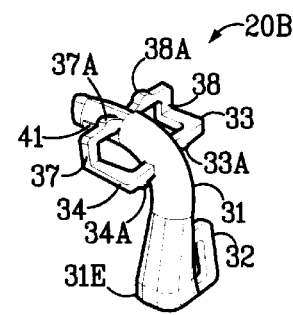
Figure 3A:
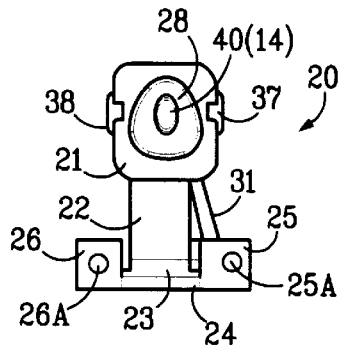
FIGS. 3A–3G illustrates the light pipe of FIGS. 2A–2G mounted to the support portion of FIGS. 1A–1G to fashion the integrated status indicator and switch operating member of the present invention.
Figure 3B:
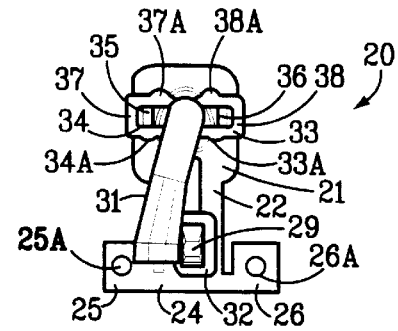
Figure 3C:
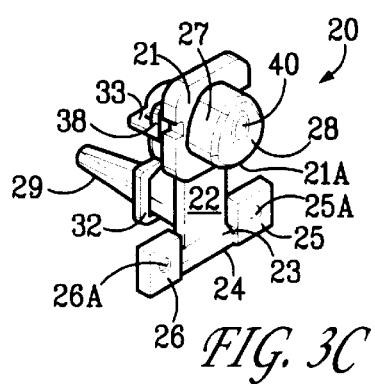
Figure 3D:
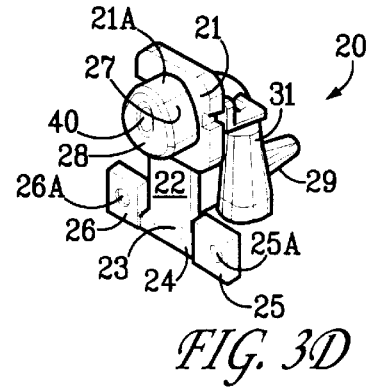
Figure 3E:
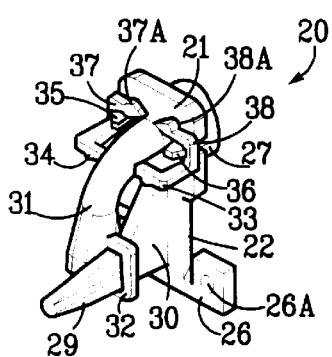
Figure 3F:
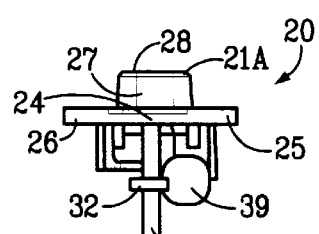
Figure 3G:
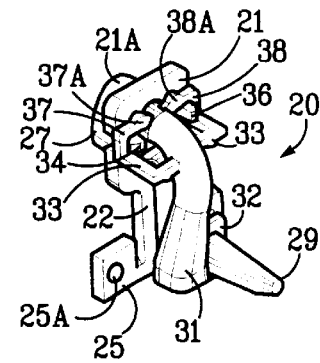

Referring now to FIGS. 2A–2G, there is illustrated the light pipe 20B of the present invention. As illustrated, the light pipe 20B has a generally "J"-shaped body 31, and is formed from, e.g., a polycarbonate (PC) plastic such as Lexan® 121R available from GE. As illustrated in FIGS. 2A and 2B, the body 31 is angled with respect to vertical by an angle α such that the light pipe 20B may be positioned over a light emitting element 52 (e.g., an LED) on the printed circuit board 49 (see, FIG. 5). The upper portion of the body 31 is formed as a tapered section 31A, which terminates as an oval-shaped tip 31B having parallel sides. The tip 31B is shaped such that it may be received by the generally oval-shaped opening 43 in the face 28 of the support 20A (see, FIG. 3). Two wedge shaped protrusions 41 and 42 are formed on opposing sides of the tapered section 31A. The wedge shaped protrusions 41 and 42 terminate that the boundary between the tapered section 31A and the tip 31B. The wedge shaped protrusions 41 and 42 are provided to contact the rear of the face 28 when the light pipe 20B is mounted to the support 20A to properly position the tip 31B within the opening 43.

At the point where the tapered section 31A meets the mid-section of the body 31, a pair of brackets 31C and 31D are connected, which are provided for use in mounting the light pipe 20B to the support 20A. Each bracket 31C and 31D comprises two generally "L"-shaped sections 33 and 38, and 34 and 37, respectively. One leg of each "L" is attached to the light pipe 20B, and other legs of each "L" are connected together at a generally 90° angle. On each "L"-shaped portion is a ridge 33A, 34A, 37A and 38A that are ejector pins for pushing the "L"-shaped portion out of a mold within which it is formed. While not essential to the invention, the ridges 33A, 34A, 37A and 38A serve to increase the area of "L"-shaped section so that it is easier to press the section from the mold after cooling.

Formed at the bottom of the body 31 is a base portion E that has substantially vertical parallel sides. The base portion 31E has a surface 39 which receives light from, e.g., the LED 52, which is transmitted through the body 31 and exits at the status indicator face 40 to provide information to a user. A generally "U"-shaped member 32 is provided which has one end attached to the surface 39 of the base portion 31E and the other end attached to the body 31.

Referring now to FIGS. 3A–3G, there is illustrated the support member 20A with the light pipe 20B mounted thereto to fashion the integrated switch 20 of the present invention. As discussed briefly above, the hooks 35 and 36 engage "L"-shaped portions 37 and 38, respectively, of the light pipe 20B to secure the light pipe 20B to the support 20A. When the light pipe 20B is mounted to the support 20A, the wedge shaped protrusions 41 and 42 contact the rear of the face 28 to properly position the tip 31B within the opening 43. In addition, the "U"-shaped member 32 is supported by the lever section 29 and the triangular portion 30 at the vertex 29B between the lever section 29 and the triangular portion 30.

Figure 4:
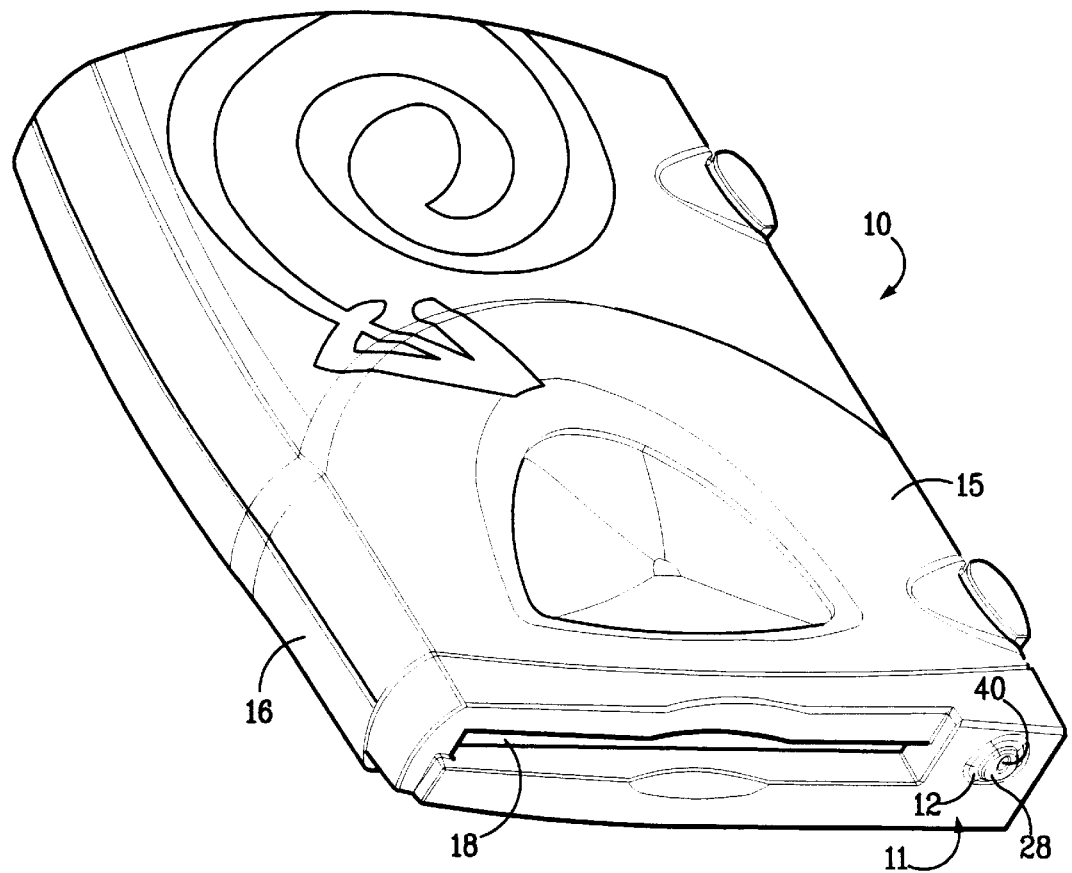
FIG. 4 is a perspective view of the top and front of an electrical device in which the switch operating member having a status light pipe in accordance with the present invention may be used.
Figure 5:
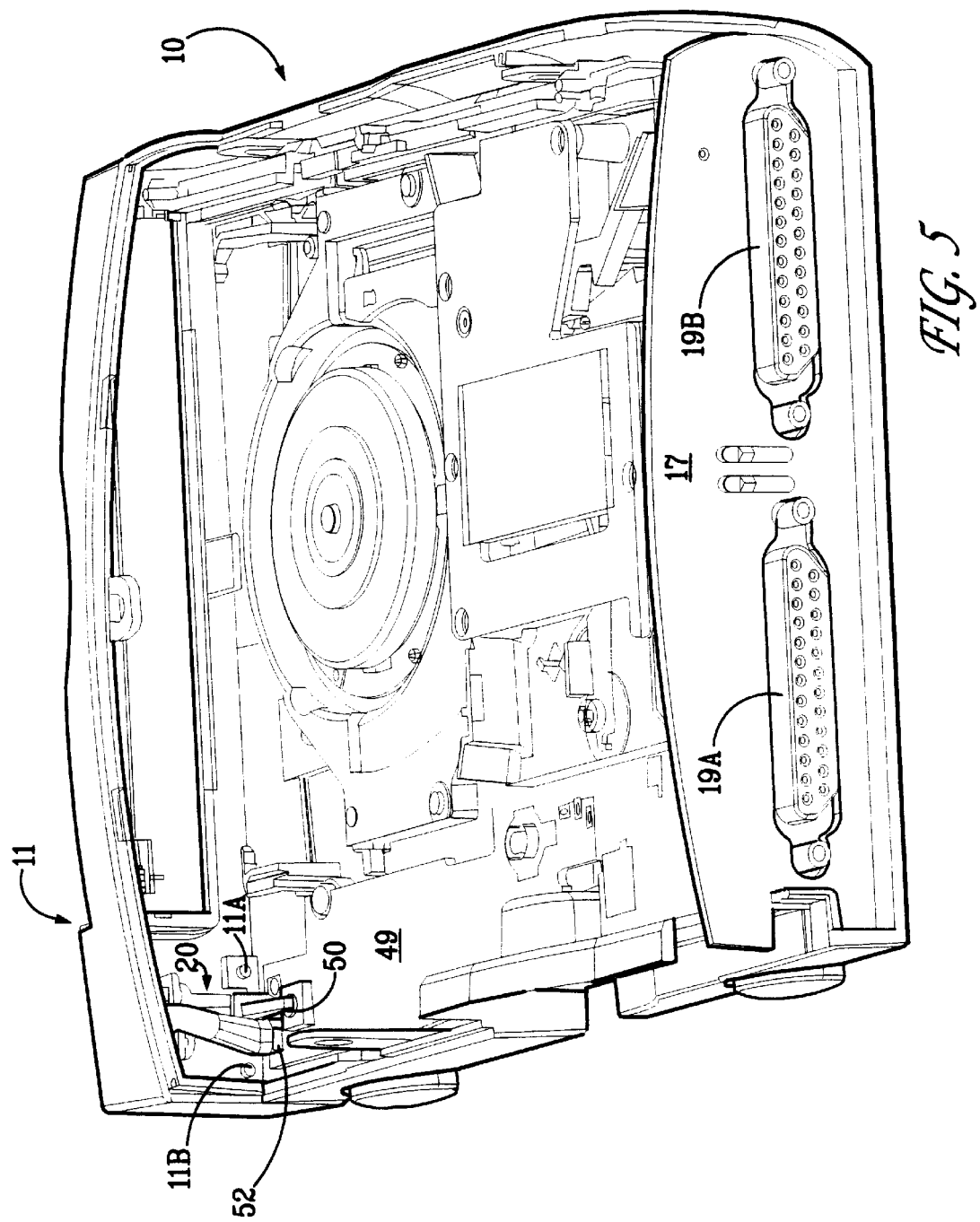
FIG. 5 is a perspective view of the top and rear of the electrical device, with a cover removed.

Referring to FIGS. 4 and 5, there is illustrated an exemplary electrical device 10, which may comprise an ZIP drive, manufactured by Iomega Corporation, Roy, Utah. The exemplary electrical device 10 may be formed having a cover 15, a base 16, a front panel 11, and a rear panel 17. The front panel 11 may be provided with a slot 18, into which a disk cartridge (not shown) may be inserted for use. The rear panel 17 may be formed having connectors 19A and 19B to communicate information to a personal computer and other electrical devices. The front panel 11 defines a generally ovoid-shaped opening 12, within which the switch 20 is provided having a status indicator face 40. The status indicator face 40 may be illuminated at predetermined times to indicate, e.g., read/write operations, or when the device is busy.

Referring to FIG. 5, where is illustrate the integrated switch 20 as mounted to the electrical device 10. As can be appreciated by one of skill in the art, the support portion 20A supports the light pipe 20B in plural locations to accurately align the light pipe 20B to the support portion 20A and the LED 52. In particular, in order to transmit light from the LED 52 through the light pipe 20B such that a maximum quantity of light is visible at the indicator face 40, the light pipe 20B must be maintained in accurate alignment throughout the range of motion of the switch 20.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A switch-operating member incorporating a status indicator, comprising:
   a support comprising a base, a support body, and a head having a protrusion and hooks that extend from said head in a direction opposite said protrusion; and
   a light pipe comprising an indicator face, a light conducting body, and a light conducting base.

2. The switch-operating member as recited in claim 1, wherein said hooks engage a portion of said light pipe to secure said light pipe to said support.

3. The switch-operating member as recited in claim 1, wherein said light conducting body is formed having a predetermined shape such that said light conducting body is adapted to be received by said support.

4. The switch-operating member as recited in claim 1, wherein said light conducting body further comprising brackets, said brackets being adapted to be received by said hooks to mount said light pipe to said support.

5. The switch-operating member as recited in claim 4, wherein each bracket comprises two generally "L"-shaped sections, wherein one leg of each "L" is attached to said light pipe, and other legs of each "L" are connected together at a predetermined angle.

6. The switch-operating member as recited in claim 1, wherein said light conducting body comprises an upper portion formed as a tapered section which terminates at a tip having generally parallel sides.

7. The switch-operating member as recited in claim 6, wherein said upper portion comprises wedge shaped protrusions formed on opposing sides of said tapered section, said wedge shaped protrusions being provided to contact a rear of said protrusion when said light pipe is mounted to said support.

8. The switch-operating member as recited in claim 1, wherein said protrusion defines a first opening such that a portion of said light pipe may pass therethrough.

9. The switch-operating member as recited in claim 8, wherein said protrusion is adapted to pass through a second opening in an electrical device.

10. The switch-operating member as recited in claim 8, wherein said indicator face is adapted to be received by said first opening.

11. The switch-operating member as recited in claim 1, wherein said base comprises a recess and generally rectangular ends that each define an aperture through which a corresponding shaft of an electrical device to which said switch-operating member is to be mounted passes,
   wherein said switch-operating member is mounted to said shafts such that said switch-operating member hinges about said recess to engage a contact switch provided in said electrical device.

12. The switch-operating member as recited in claim 11, wherein said switch-operating member receives light from a light source in said electrical device and transmits said light via said light pipe such the light is visible at said indicator face.

13. The switch-operating member as recited in claim 12, wherein said indicator face extends through a first opening defined by said protrusion when said light pipe is mounted to said support.

14. The switch-operating member as recited in claim 13, wherein said protrusion extends through a second opening in said electrical device, such that said protrusion and said indicator face extend from said electrical device.

15. The switch-operating member as recited in claim 1, wherein said base further comprises rectangular ends, said rectangular ends being adapted to be mounted to an electrical device.

16. The switch-operating member as recited in claim 15, wherein said support further comprises a lever section and a lever support section.

17. The switch-operating member as recited in claim 16, wherein said lever section is adapted to engage a contact switch in an electrical device.

18. The switch-operating member as recited in claim 16, wherein said light conducting base comprises a generally "U"-shaped member that is adapted to be received by said lever section.

19. An electronic device, comprising:
   a switch having a status indicator incorporated therein, said switch comprising a support having a lever section and a lever support section, and said status indicator comprising a light pipe,
   wherein said switch is mounted to said electronic device and said light pipe transmits light from a light source located within said electronic device to an indicator face of said light pipe that is positioned within a first opening of a protrusion that extends from said support, such that said protrusion and said indicator face are external of said electronic device.

20. The electrical device as recited in claim 19, wherein said lever section is adapted to engage a contact switch in said electrical device.

21. The electronic device as recited in claim 19, wherein said support comprises a base, a support body, and a head having a protrusion, and wherein said light pipe comprises an indicator face, a light conducting body, and a light conducting base.

22. The electrical device as recited in claim 21, wherein said base further comprises rectangular ends, said rectangular ends being adapted to be mounted to an electrical device.

23. A switch incorporating a status indicator, comprising:
   a support comprising a base, a support body, a head having a protrusion, and a lever section; and
   a light pipe comprising an indicator face, a light conducting body, and a light conducting base,
   wherein said protrusion defines a first opening such that said indicator face of said light pipe may pass therethrough, and
   wherein said protrusion is adapted to pass through a second opening in an electrical device.

24. The switch as recited in claim 23, wherein said base further comprises rectangular ends, said rectangular ends being adapted to be mounted to said electrical device.

25. The switch as recited in claim 23, wherein said lever section is adapted to engage a contact switch in said electrical device.

26. The switch as recited in claim 23, wherein said switch receives light from a light source in said electrical device and transmits said light via said light pipe such the light is visible at said indicator face.

27. The switch as recited in claim 23, wherein said head further comprises hooks that extend from said head in a direction opposite said protrusion, and wherein said hooks engage a portion of said light pipe to secure said light pipe to said support.

28. The switch as recited in claim 27, wherein said light conducting body further comprising brackets, said brackets being adapted to be received by said hooks to mount said light pipe to said support.

* * * * *

UNITED STATES PATENT AND TRADEMARK OFFICE
CERTIFICATE OF CORRECTION

PATENT NO. : 6,129,440
DATED : October 10, 2000
INVENTOR(S) : Douglas S. Reynolds It is certified that error appears in the above-identified patent and that said Letters Patent is hereby corrected as shown below:

Column 4, line 9, after "support" delete the word "a";

Column 6, line 42, after "FIG. 5," delete "where" and insert --there--

Signed and Sealed this

Twenty-second Day of May, 2001

Attest:

NICHOLAS P. GODICI

Attesting Officer  Acting Director of the United States Patent and Trademark Office